May 29, 1956        S. N. SMALL        2,747,625
BLOCK-AND-TAPE LUMBER MEASURING DEVICE FOR BENCH SAWS
Filed Nov. 12, 1954        2 Sheets-Sheet 1
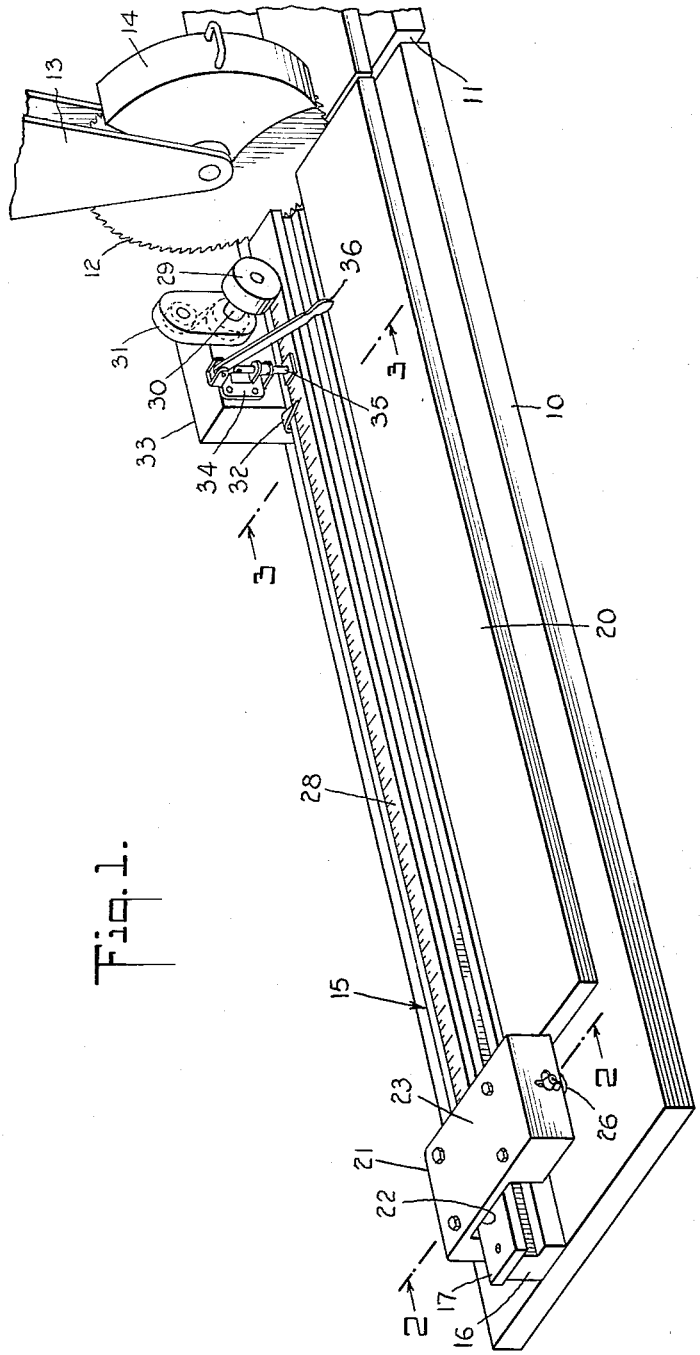
INVENTOR.
SAMUEL N. SMAL
BY
*Howard E. Thompson*
ATTORNEY May 29, 1956 S. N. SMALL 2,747,625
BLOCK-AND-TAPE LUMBER MEASURING DEVICE FOR BENCH SAWS
Filed Nov. 12, 1954 2 Sheets-Sheet 2
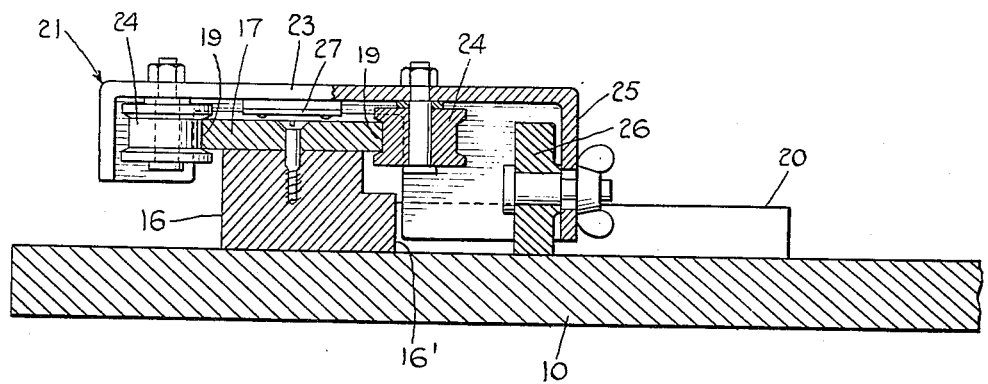
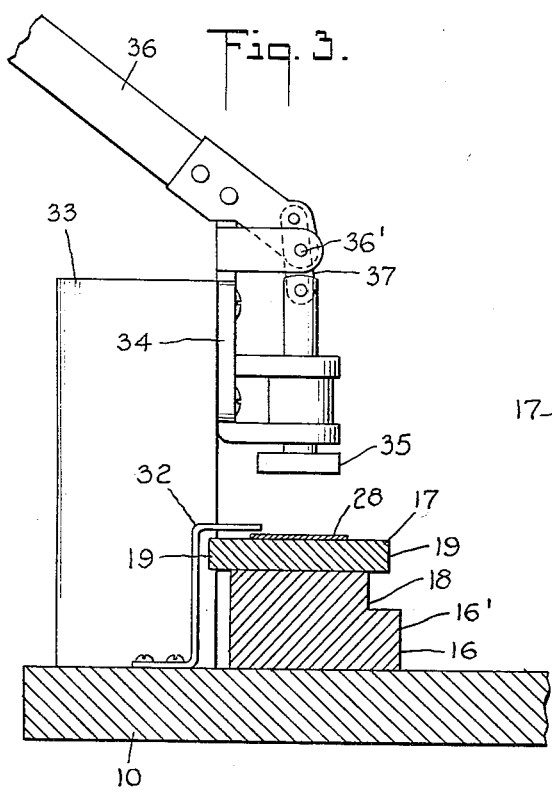
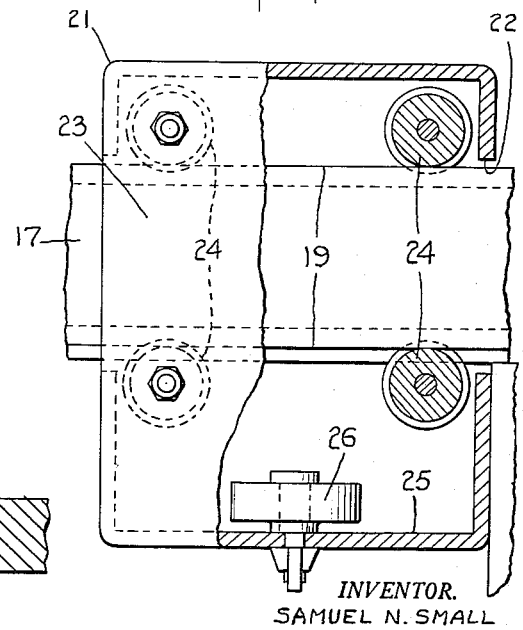
INVENTOR.
SAMUEL N. SMALL
BY
ATTORNEY United States Patent Office 2,747,625
Patented May 29, 1956

2,747,625

BLOCK-AND-TAPE LUMBER MEASURING DEVICE FOR BENCH SAWS

Samuel N. Small, Valley Stream, N. Y., assignor, by mesne assignments, to Atkins Industries, Inc., Ozone Park, N. Y.

Application November 12, 1954, Serial No. 468,423

5 Claims. (Cl. 143—174)

This invention relates to devices for use on a saw bench for measuring lengths of lumber in the operation of cutting the same. More particularly, the invention deals with a measuring device comprising a stop block and rule fixed thereto for visibly indicating to the operator a predetermined workpiece length, with means for fixing the block and measuring tape in adjusted position.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a perspective view, diagrammatically illustrating a saw bench and saw, showing one of my improved measuring devices arranged thereon.

Fig. 2 is an enlarged section on the line 2—2 of Fig. 1.

Fig. 3 is an enlarged section on the line 3—3 of Fig. 1; and

Fig. 4 is a plan view of the structure shown in Fig. 2, with part of the construction broken away and in section.

In Fig. 1 of the drawing, I have indicated at 10 the top table of a saw bench, slotted, as seen at 11, to receive a cutting saw 12, the saw, in the structure shown, being of the swinging type and supported on a hanger, partially seen at 13, the saw having a handpiece shield, as noted at 14. At 15 is shown one of my improved devices fixed to a rear edge portion of the table 10 and extending longitudinally thereof in the direction of the saw slot 11.

The device comprises a grooved strip 16, to which is fixed a rail 17, the groove 18 of the strip 16 being in an upper forward corner, as clearly noted, and the rail 17 is of such width as to provide protruding sides 19 extending beyond adjacent portions of the strip 16. However, one protruding side is disposed inwardly of the forward edge 16' of the strip 16, which edge constitutes a straight edge, upon which a workpiece 20 is adapted to bear, as is clearly noted in Figs. 1 and 2 of the drawing. The strip 16, as well as the rail 17, extends from one end of the table up to and terminates at the saw slot 11.

Slidably mounted on the rail 17 is a stop block 21, having an opening 22 therein for receiving the rail to permit free sliding movement of the block longitudinally of the rail. Fixed to the top wall 23 of the stop block 21 are two pairs of grooved rollers 24, which are arranged within the block and operatively engage the protruding sides 19 of the rail 17, as clearly noted in Figs. 2 and 4 of the drawing. The block, in the construction shown, is of hollow casing-like construction, as will clearly appear from a consideration of Figs. 2 and 4 of the drawing. Rotatably mounted in connection with the front wall 25 of the stop block 21 is another roller 26, which operates upon the table 10 and maintains the block 21 in horizontal position.

Fixed to the inner surface of the top wall 23 of the stop block 21 is one end 27 of a measuring tape 28. The tape 28 is in the form of well-known metal measuring tapes and the other end of the tape is wound upon a suitable spool 29, having a protruding axis 30 extending into a spring winding device 31 of standard construction, the winding device 31 having the property of self-winding the tape 28, so that the block 21 can be moved into any adjusted position, being gauged in this adjustment by an indicator 32 fixed to the table 10, as clearly noted in Fig. 3 of the drawing. It will be understood, in this connection, that the measurement indicated on the tape 28 will indicate the distance between the surface of the block 21 engaged by the workpiece 20 and the nearest edge of the cutting slot 11 or, preferably, the nearest surface of the saw blade 12.

The winding device 31 is mounted in connection with an upstanding column or block 33, to which is also secured a bracket 34 supporting a gripper plunger 35. The plunger 35 is actuated through a lever 36, pivoted to the bracket, as seen at 36' in Fig. 3. The lever 36 has a link connection with the plunger 35, as seen at 37. The lever 36 is operated in movement of the plunger into operative engagement with the tape 28 to support the tape as well as the block 21 in an adjusted position. Upon releasing the clamp plunger 35, the position of the stop block 21 can be changed in providing other measurements of the workpiece to be cut.

It will appear from the foregoing that the desired adjustment for controlling cutting of workpiece lengths can be quickly and easily accomplished. Workpieces are usually fed along a table 10 from right to left and brought into engagement with the block 21, as well as the edge 16' of the strip 16. In cutting the workpieces, the saw 12 is moved across the slot 11 in severing the workpiece in the manner diagrammatically illustrated in Fig. 1 of the drawing.

The side abutment surface 16' of the strip 16, in protruding beyond the corresponding edge 19 of the rail, provides a square edge, against which workpieces of any desired thickness can be arranged. By way of thickness, what is meant is the distance between the surface of the workpiece engaging the table and the opposed upper surface thereof. While the device is intended primarily in cutting relatively long lengths of workpieces, it will be understood that, when short cuts are to be formed, suitable spacers can be arranged between the stop block 21 and the edge of the workpiece, so that relatively close measured cuts can be formed transversely of the workpiece.

Having fully described my invention, what I claim as new and desire to secure by Letters Patent is:

1. A workpiece measuring device for bench saws, said device comprising an elongated grooved strip extending longitudinally of the table of a bench saw, a rail fixed to said strip and having side edges overlying adjacent edges of said strip, a stop block slidably mounted on said rail, means for guiding the block on the rail and said table, an elongated measuring tape having one end fixed to said block, a spring control spool supporting the other end of said tape, a saw movable transversely of said table for cutting lumber supported on the table at an end of said rail, means adjacent and in spaced relation to said end of the rail for indicating on the tape a predetermined workpiece length between said stop block and said saw, and means for fixedly retaining the tape and stop block in predetermined measurement positions.

2. A workpiece measuring device for bench saws, said device comprising an elongated grooved strip extending longitudinally of the table of a bench saw, a rail fixed to said strip and having side edges overlying adjacent edges of said strip, a stop block slidably mounted on said rail, means for guiding the block on the rail and said table, an elongated measuring tape having one end fixed to said block, a spring control spool supporting the other end of said tape, a saw movable transversely of said table for cutting lumber supported on the table at an end of said rail, means adjacent and in spaced relation to said end of the rail for indicating on the tape a predetermined workpiece length between said stop block and said saw, means for fixedly retaining the tape and stop block in predetermined measurement positions, and said last named means comprising a clamp operatively engaging the tape adjacent said end of the rail.

3. A workpiece measuring device for bench saws, said device comprising an elongated grooved strip extending longitudinally of the table of a bench saw, a rail fixed to said strip and having side edges overlying adjacent edges of said strip, a stop block slidably mounted on said rail, means for guiding the block on the rail and said table, an elongated measuring tape having one end fixed to said block, a spring control spool supporting the other end of said tape, a saw movable transversely of said table for cutting lumber supported on the table at an end of said rail, means adjacent and in spaced relation to said end of the rail for indicating on the tape a predetermined workpiece length between said stop block and said saw, means for fixedly retaining the tape and stop block in predetermined measurement positions, said last named means comprising a clamp operatively engaging the tape adjacent said end of the rail, and the guide means of said stop block comprising pairs of grooved rollers engaging side edges of said rail.

4. A workpiece measuring device for bench saws, said device comprising an elongated grooved strip extending longitudinally of the table of a bench saw, a rail fixed to said strip and having side edges overlying adjacent edges of said strip, a stop block slidably mounted on said rail, means for guiding the block on the rail and said table, an elongated measuring tape having one end fixed to said block, a spring control spool supporting the other end of said tape, a saw movable transversely of said table for cutting lumber supported on the table at an end of said rail, means adjacent and in spaced relation to said end-of-the-rail for indicating on the tape a predetermined workpiece length between said stop block and said saw, means for fixedly retaining the tape and stop block in predetermined measurement positions, said last named means comprising a clamp operatively engaging the tape adjacent said end of the rail, the guide means of said stop block comprising pairs of grooved rollers engaging side edges of said rail, and another roller operatively engaging the surface of the table.

5. A workpiece measuring device for bench saws, said device comprising an elongated grooved strip extending longitudinally of the table of a bench saw, a rail fixed to said strip and having side edges overlying adjacent edges of said strip, a stop block slidably mounted on said rail, means for guiding the block on the rail and said table, an elongated measuring tape having one end fixed to said block, a spring control spool supporting the other end of said tape, a saw movable transversely of said table for cutting lumber supported on the table at an end of said rail, means adjacent and in spaced relation to said end of the rail for indicating on the tape a predetermined workpiece length between said stop block and said saw, means for fixedly retaining the tape and stop block in predetermined measurement positions, said last named means comprising a clamp operatively engaging the tape adjacent said end of the rail, the guide means of said stop block comprising pairs of grooved rollers engaging side edges of said rail, another roller operatively engaging the surface of the table, and said strip having a workpiece abutment edge protruding beyond one of the side edges of said rail.

References Cited in the file of this patent
UNITED STATES PATENTS

| | | |
|---|---|---|
| 2,619,134 | West | Nov. 25, 1952 |
| 2,675,836 | Ellis | Apr. 20, 1954 |